United States Patent
Schiffhauer et al.

(10) Patent No.: US 8,869,963 B2
(45) Date of Patent: Oct. 28, 2014

(54) ARRANGEMENT FOR SHIFTING A GEARBOX

(75) Inventors: Michael Schiffhauer, Friedrichshafen (DE); Jörg Börner, Friedrichshafen (DE); Gabor Diosi, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 270 days.

(21) Appl. No.: 13/445,017

(22) Filed: Apr. 12, 2012

(65) Prior Publication Data

US 2012/0285786 A1  Nov. 15, 2012

(30) Foreign Application Priority Data

May 13, 2011 (DE) .......................... 10 2011 075 775

(51) Int. Cl.
 *F16D 11/10* (2006.01)
 *F16D 25/061* (2006.01)
(52) U.S. Cl.
 CPC .................................. *F16D 25/061* (2013.01)
 USPC ........ 192/69.9; 192/108; 192/114 T; 475/138
(58) Field of Classification Search
 USPC ............. 192/69.9, 69.1, 108, 114 T; 475/138, 475/116, 326
 See application file for complete search history.

(56) References Cited

U.S. PATENT DOCUMENTS

| | | | | |
|---|---|---|---|---|
| 2,426,023 A | * | 8/1947 | Jeppesen et al. | 192/69.7 |
| 2,747,424 A | * | 5/1956 | Osplack et al. | 74/459.5 |
| 3,311,000 A | * | 3/1967 | Gustav | 477/64 |
| 6,652,405 B2 | * | 11/2003 | Staheli et al. | 475/138 |
| 7,140,997 B2 | * | 11/2006 | Tiesler et al. | 475/278 |
| 2008/0022800 A1 | * | 1/2008 | Kobayashi | 74/462 |
| 2010/0199799 A1 | | 8/2010 | Gumpoltsberger et al. | |
| 2010/0248884 A1 | * | 9/2010 | Tremblay | 475/138 |
| 2010/0313706 A1 | * | 12/2010 | Hellinger et al. | 74/665 H |

FOREIGN PATENT DOCUMENTS

| | | |
|---|---|---|
| DE | 1 936 017 | 1/1970 |
| DE | 100 07 168 A1 | 9/2000 |
| DE | 103 06 935 A1 | 9/2004 |
| DE | 10 2006 055 449 A1 | 9/2007 |
| DE | 10 2007 040 040 A1 | 2/2009 |
| DE | 10 2008 042 038 A1 | 3/2010 |
| DE | 10 2008 059 978 A1 | 6/2010 |
| DE | 10 2009 051 465 A1 | 5/2011 |

OTHER PUBLICATIONS 2005 article to Borner, Jorg / www.geartechnology.com.*
Shorthand definition of beveloid at www.hygears.com.*
Wikipedia articles: keyword "gear" and "involute gearing".*
Picture of a beveloid gear at http://okamoto-kouki.co.jp/mt/en/products_10con.html.*

* cited by examiner

*Primary Examiner* — Troy Chambers
*Assistant Examiner* — Ryan Dodd
(74) *Attorney, Agent, or Firm* — Davis & Bujold, PLLC; Michael J. Bujold

(57) ABSTRACT

An arrangement for shifting a gearbox. The arrangement having first and second transmission components (14) and an axially movable shifting sleeve (17) such that the shifting sleeve (17) and the second transmission component (14) each have respective drive teeth (14*a*, 17*a*) that can be brought into engagement with one another. The drive teeth are in the form of beveloid teeth (14*a*, 17*a*).

13 Claims, 3 Drawing Sheets

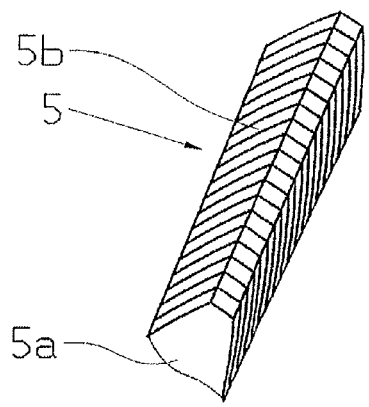
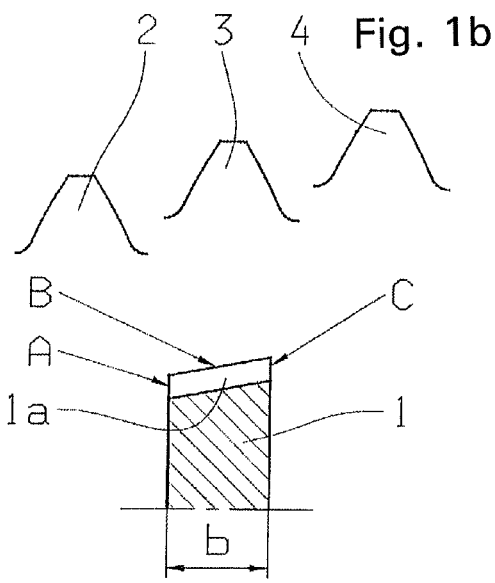
Fig. 1a
Fig. 1
Fig. 1b
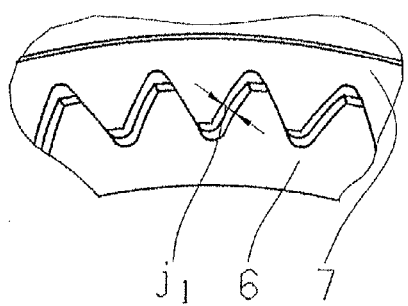
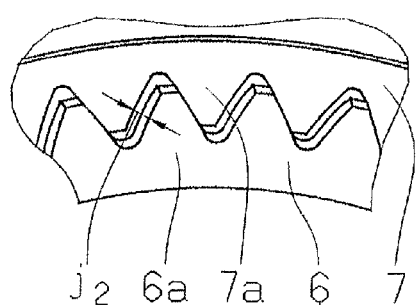
Fig. 2a
Fig. 2b

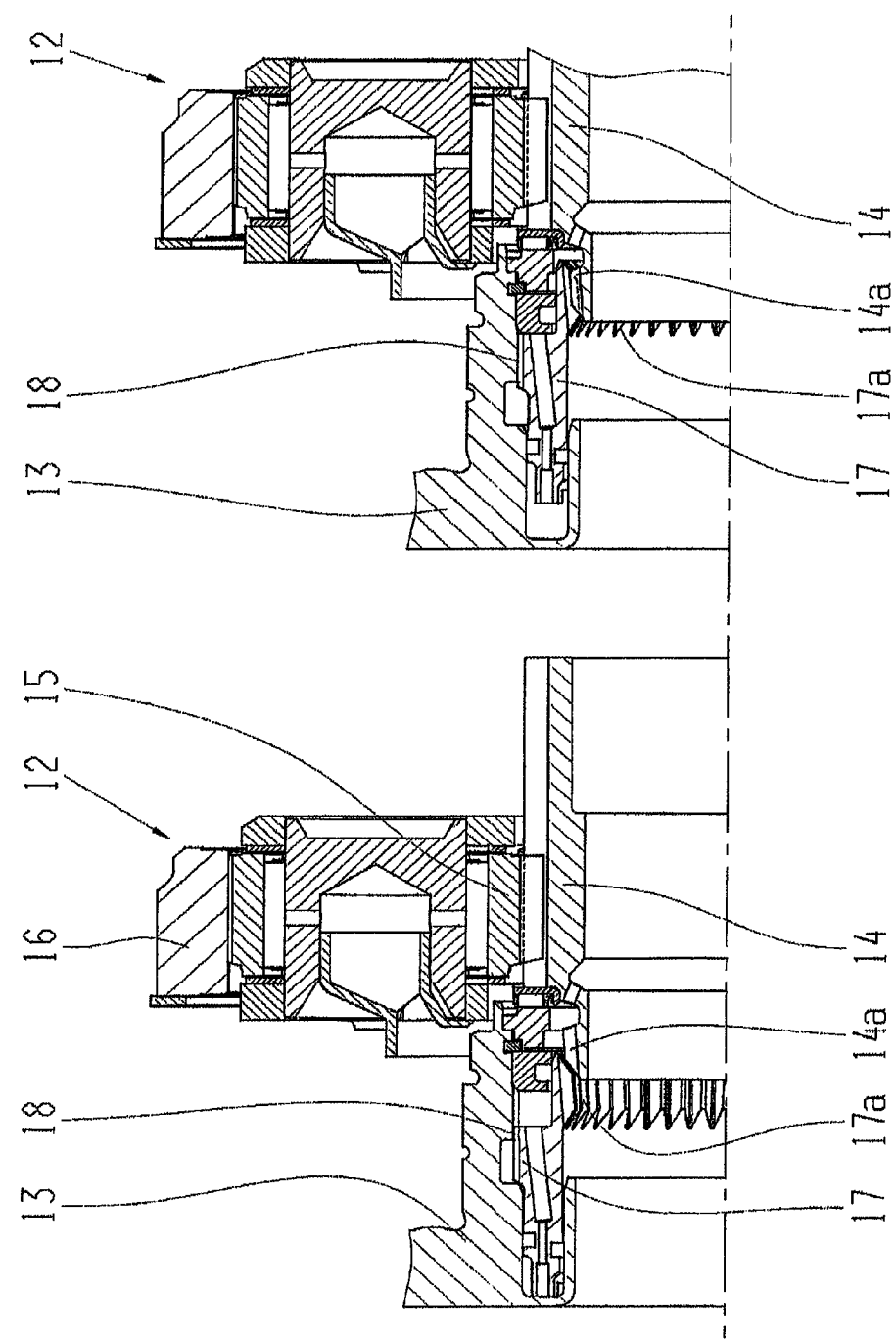

ARRANGEMENT FOR SHIFTING A GEARBOX

This application claims priority from German patent application serial no. 10 2011 075 775.9 filed May 13, 2011.

FIELD OF THE INVENTION

The invention concerns an arrangement for shifting a gearbox.

BACKGROUND OF THE INVENTION

The invention starts from a shifting arrangement of the type known as a claw shifting element. By means of this, a first transmission component is connected by an axially displaceable shifting or sliding sleeve to a second transmission component. The shifting sleeve and the transmission component to be connected have drive or shifting teeth, namely outer teeth and inner teeth, which by being pushed one inside the other form a rotationally fixed connection so that a torque can be transmitted or supported. The shifting sleeve must be engaged when the rotational speed difference is minimal, preferably zero. Due to the steep rotational speed gradient only a short amount of time is available for this. Thus, with conventional drive or claw teeth a relatively large tooth flank clearance must be provided to enable the claws to engage within the given time window. However, too large a tooth flank clearance is undesirable.

Drive teeth as used in known claw shifting elements have a relatively simple tooth profile, for example a trapezoidal or triangular profile. In the case of running gears in which the gearwheels mesh with one another by a rolling action, other tooth profiles such as involute profiles are used. The known running gears also have beveloid teeth, i.e. teeth for conical spur gears whose rotational axes intersect, cross, or can also be parallel to one another.

From DE 103 06 935 A1 by the present applicant a spur gear stage with beveloid gearwheels is known, which have equal-sized but oppositely directed cone angles. To reduce the rotational flank clearance the beveloid gearwheels are adjusted in the axial direction by a temperature-dependent element. Thus, the known gearwheel transmission has beveloid running gears for conical spur gearwheels with parallel axes.

Beveloid running gears are also known for driving so-termed lateral shafts in motor vehicle transmissions for an all-wheel drive system. From DE 10 2008 042 038 A1 by the present applicant a beveloid drive with intersecting or crossing rotational axes for a drive-train of a motor vehicle is known.

SUMMARY OF THE INVENTION

The purpose of the present invention is, with a shifting arrangement of the type described at the start, to enable a shifting process to take place even with larger rotational speed differences.

According to the invention, the drive teeth are formed as beveloid teeth, also called shifting teeth. According to the invention, the beveloid teeth until now known only as running gearing is used as shifting teeth. Beveloid teeth are involute teeth in which the profile displacement varies over the tooth width. The result is that the teeth of the shifting gears become thicker in the tooth width direction, so the flank clearance becomes smaller. At the beginning of the shifting displacement, i.e. when the sliding sleeve engages in the shifting teeth, the teeth—as viewed in the circumferential direction—are relatively narrow so the flank clearance is relatively large. In contrast, at the end of the shifting displacement the teeth are relatively thick, resulting in a small flank clearance. Thus, the flank clearance decreases along the direction of the shifting displacement. This has the advantage that engagement and disengagement are possible even with higher rotational speed differences. Beveloid teeth have the advantage of being produced by continuous machining, which therefore also brings cost advantages compared with known drive gears.

In a preferred embodiment the beveloid teeth are in the form of straight teeth, i.e. without any obliqueness. The straight teeth enable the shifting gears to be symmetrical, i.e. to have a symmetrical tooth profile.

In another preferred embodiment the beveloid teeth are oblique teeth with an angle of inclination $\beta$ which is within a preferred range larger that 0° and smaller than 3°, particularly preferably 2°. The oblique teeth make it possible to have asymmetrical shifting gears, i.e. with an asymmetrical tooth profile.

In a further preferred embodiment the tooth flanks of the beveloid teeth have flank angles of inclination $\beta_L$ and $\beta_R$ which are equal for both flanks in the case of straight teeth. Thus, as viewed in the circumferential direction the thickness of the tooth profile increases symmetrically in the tooth width direction.

According to another preferred embodiment only one tooth flank of a tooth profile has a flank angle of inclination>0°, so that the tooth profile is asymmetrical. Preferably, the one tooth flank has a flank angle of inclination of about 4° and the other tooth flank a flank angle of inclination of 0°.

In a further preferred embodiment the shifting sleeve has inner shifting teeth, also called claws, whereas the second transmission component has outer shifting teeth. Thus, by axial displacement, the claws can be pushed over the shifting teeth of the second transmission component and the shifting process is carried out thereby. In this case the flank clearance is at a maximum at the beginning of the shifting displacement and at a minimum at the end of the shifting displacement.

According to another preferred embodiment the second transmission component is an element of a planetary gearset. Preferably the element is the sun gear, but it can also be the carrier or the ring gear of the gearset. In this way the planetary gearset element concerned can be connected by the shifting sleeve in a rotationally fixed manner to the first transmission component.

In a further preferred embodiment the shifting sleeve is supported in a rotationally fixed manner, for example on a transmission housing. In this way a planetary gearset element can be braked.

In another preferred embodiment the transmission is in the form of an automatic variable-speed transmission of a motor vehicle. Compared with conventional automatic transmissions this means that the known shifting elements in the form of disk clutches and/or brakes can be omitted in favor of shifting elements with beveloid shifting teeth. This saves fitting space, weight and costs.

BRIEF DESCRIPTION OF THE DRAWINGS

Example embodiments of the invention are illustrated in the drawing and described in more detail below, whereby further characteristics and/or advantages can emerge from the description and/or the drawings, which show:

FIG. 1: A conical spur gear with beveloid teeth,

FIG. 1a: A single tooth, shown in perspective,

FIG. 1b: Tooth profile of the beveloid teeth shown in FIG. 1,

FIGS. 2a, 2b: Radial sections through shifting teeth according to the invention, at different shifting displacements, FIGS. 5, 6: A shifting element with shifting teeth according to the invention for a planetary gearset, in different shifting positions.

DETAILED DESCRIPTION OF THE PREFERRED EMBODIMENTS

Figure 3A:
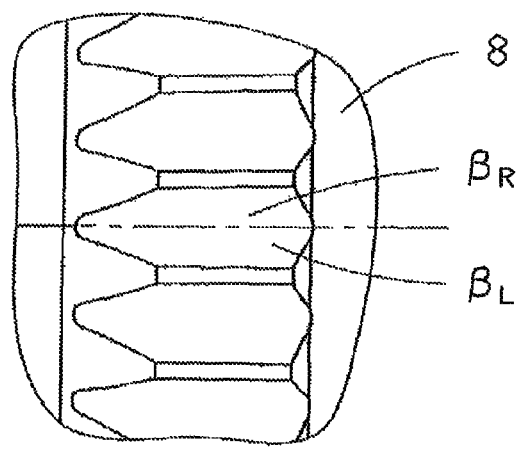
FIGS. 3a, 3b: Symmetrical shifting teeth in the form of straight teeth with equal flank angles of inclination.

FIG. 1 shows a conical spur gear 1 with beveloid teeth 1a and a tooth width 1b, viewed in semi-section. The beveloid teeth 1a have a profile displacement that varies over the tooth width b. This is indicated in FIG. 1b by different tooth profiles 2, 3, 4 which correspond to the radial section planes at the points of the beveloid teeth 1a identified by the arrows A, B, C. From this representation it can be seen that the tooth profile becomes thicker from the front face (arrow A) to the rear face (arrow C), the tooth thickness being measured in the circumferential direction, FIG. 1a shows a perspective view of a single tooth 5 of the beveloid teeth 1a. The front end of the tooth 5 is called the toe 5a and the rear end of the tooth 5 is called the heel 5b. The result of the thickness variation is a tooth flank angle of inclination, as explained in more detail below.

FIGS. 2a, 2b show shifting teeth for a transmission component 6 and a sliding or shifting sleeve 7. The transmission component 6, which for example can be in the form of the sun gear of a planetary gearset (see FIGS. 5, 6), has outer teeth 6a whereas the shifting sleeve 7 has inner teeth 7a, which are in tooth engagement with one another and can be displaced axially, i.e. in the shifting direction. The two sets of teeth 6a, 7a are in the form of beveloid teeth with flank angles of inclination that extend in opposite directions. FIG. 2a shows the shifting teeth 6a, 7a at a shifting displacement point that corresponds to the middle of the total shifting displacement. The flank clearance between the two sets of teeth 6a, 7a is represented by the dimension $j_1$.

FIG. 2b shows the same shifting teeth 6a, 7a at a different shifting, namely two millimeters before the position shown in FIG. 2a. In this case the flank clearance is denoted $j_2$ and it can be seen that $j_2$ is larger than $j_1$. Owing to the chosen flank obliqueness angle of the beveloid teeth the flank clearance varies as a function of the shifting displacement (see also FIGS. 5, 6), being relatively large at the beginning of the shifting displacement and relatively small at the end of the shifting displacement. This enables engagement and disengagement to take place even at higher rotational speed differences between the transmission component 6 and the shifting sleeve 7. Furthermore, a larger flank angle of inclination also assists disengagement, i.e. the release of the shifting sleeve 7.

Figure 3B:
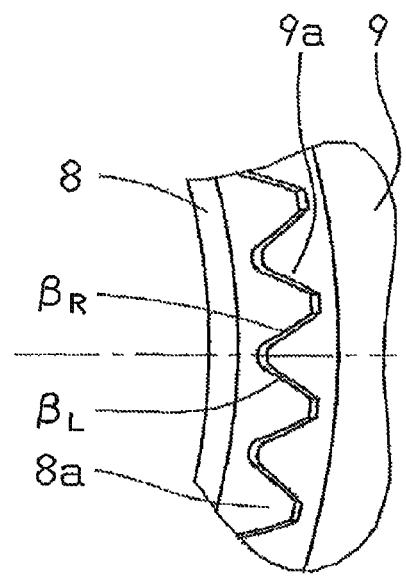

FIGS. 3a and 3b show an example embodiment of the invention for shifting teeth 8a, 9a according to the invention, which are in the form of straight teeth with a symmetrical tooth profile. The outer teeth 8a of the transmission component 8 have flank angles of inclination denoted $\beta_L$ and $\beta_R$. From FIG. 3b in particular it can be seen that the flank angles of inclination $\beta_L$ and $\beta_R$ of the two tooth flanks are equal. In a preferred example embodiment they are both equal to 2°. The flank angles of inclination $\beta_L$ and $\beta_R$ of the outer teeth 8a of the transmission component 8 and of the inner teeth 9a of the sliding sleeve 9 extend in opposite directions.

Figure 4A:
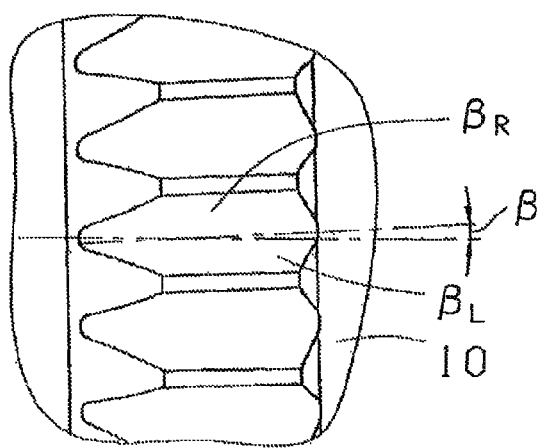
FIGS. 4a, 4b: Asymmetrical shifting teeth in the form of oblique teeth with different flank angles of inclination.
Figure 4B:
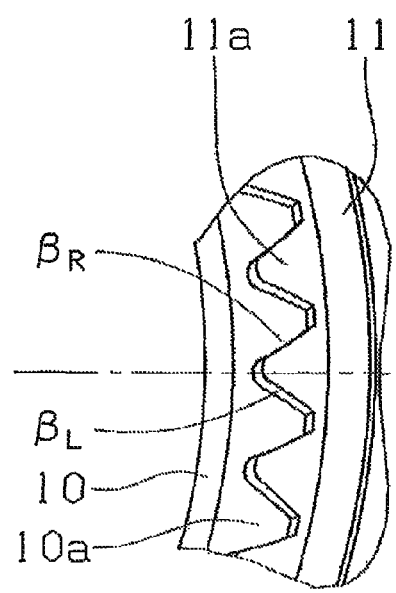

FIGS. 4a and 4b show a further example embodiment of the invention with asymmetrical shifting teeth 10a, 11a of the transmission component 10 and the shifting sleeve 11. The shifting teeth 10a have an angle of inclination β, preferably 2°. The tooth flanks have on one side a flank angle of inclination $\beta_R$ of 0° and on the other side a flank angle of inclination $\beta_L$ preferably of 4°. In this case the flank angle of inclination $\beta_R$ of 0° is on the thrust flank whereas the flank angle of inclination $\beta_L$ or 4° is on the trailing side of the shifting teeth.

FIG. 5 illustrates a section of an automatic variable-speed transmission of a motor vehicle, showing a planetary gearset 12 and a bearing support 13 fixed to the housing. The planetary gearset 12 has a sun gear 14 that meshes with a planetary gearwheel 15 which rolls around a ring gear 16. On the sun gear 14 are arranged shifting teeth 14a. In the bearing support 13 is arranged a sliding sleeve 17, also called a shifting sleeve 17, which is connected in a rotationally fixed manner by means of drive teeth 18 to the bearing support 13, i.e. to a transmission housing (not shown). The shifting sleeve 17 is actuated hydraulically or pneumatically and has inner teeth in the form of beveloid shifting teeth 17a. The shifting teeth 17a are generally referred to as claw teeth or claws and, by displacing the shifting sleeve 17 axially, they can be brought into or out of engagement with the shifting teeth 14a of the sun gear 14. In the position shown in FIG. 5 the shifting teeth 17a are in their open, i.e. disengaged position so there is no rotary connection between the sun gear 14 and the shifting sleeve 17.

FIG. 6 shows the shifting sleeve 17 in its engaged position, i.e. with the shifting teeth 17a fully engaged with the shifting teeth 14a of the sun gear 14. Thus, the shifting sleeve 17 produces a rotationally fixed connection between the sun gear 14 and the bearing support 13 fixed to the housing, i.e. the sun gear 14 is braked and supported relative to the transmission housing. The shifting teeth 14a, 17a correspond to the above-described beveloid teeth according to the invention with flank angles of inclination $\beta_L$, $\beta_R$, with a taper of about 2°. By an appropriate choice of the flank angles of inclination $\beta_L$, $\beta_R$ the flank clearance along the shifting displacement of the shifting sleeve 17 can be adjusted optimally, and at the same time the disengagement of the shifting teeth is assisted.

INDEXES

1 Conical spur gear
1a Beveloid teeth
2 Tooth profile
3 Tooth profile
4 Tooth profile
5 Tooth
5a Toe
5b Heel
6 Transmission component
6a Outer teeth
7 Shifting sleeve
7a Inner teeth
8 Transmission component
8a Outer teeth
9 Shifting sleeve
9a Inner teeth
10 Transmission component
10a Outer teeth
11 Shifting sleeve
11a Inner teeth
12 Planetary gearset 13 Bearing support
14 Sun gear
14a Shifting teeth
15 Planetary gearwheel
16 Ring gear
17 Shifting sleeve
17a Shifting teeth
18 Drive teeth
b Tooth width
β Angle of inclination
$β_L$ Flank angle of inclination of the left flank
$β_R$ Flank angle of inclination of the right flank
$j_1$ Tooth flank clearance
$j_2$ Tooth flank clearance
A Arrow (front side)
B Arrow (middle)
C Arrow (rear side)

The invention claimed is:

1. An arrangement for shifting a transmission, the arrangement comprising:
 a first transmission component, a second transmission component (14) and an axially displaceable shifting sleeve (17),
 the shifting sleeve (17) and the second transmission component (14) each comprise drive teeth (14a, 17a) which are engagable with one another, and
 the drive teeth being in a form of beveloid teeth (6a, 7a; 8a, 9a; 10a, 11a; 14a, 17a).

2. The arrangement according to claim 1, wherein a respective toe and a respective heel of each the beveloid tooth, are aligned with one another so as to from straight teeth.

3. The arrangement according to claim 1, wherein the beveloid teeth are oblique teeth (10a, 11 a) which have an angle of inclination (β) which ranges from greater than 0° to less than or equal to 3°.

4. The arrangement according to claim 1, wherein the beveloid teeth have a tooth profile (2, 3, 4) with a tooth thickness that varies over a tooth width (b), and the tooth thickness variation is determined by selecting flank angles of inclination ($β_L$, $β_R$).

5. The arrangement according to claim 4, wherein only one tooth flank of the beveloid teeth (8a, 9a; 10a, 11 a) has a flank angle of inclination ($β_L$, $β_R$) greater than 0°.

6. The arrangement according to claim 4, wherein both tooth flanks of the beveloid teeth (8a, 9a; 10a, 11 a) have a flank angle of inclination ($β_L$, $β_R$) greater than 0°.

7. The arrangement according to claim 4, wherein the flank angles of inclination ($β_L$, $β_R$) range from greater than 0° to less than or equal to 5°.

8. The arrangement according to claim 1, wherein the shifting sleeve (17) has inner shifting teeth (17a) and the second transmission component (14) has outer shifting teeth (14a).

9. The arrangement according to claim 8, wherein the second transmission component (14) is an element (14) of a planetary gearset (12).

10. The arrangement according to claim 8, wherein the shifting sleeve (17) is supported in a rotationally fixed manner.

11. The arrangement according to claim 1, wherein the transmission is an automatic variable-speed transmission of the motor vehicle.

12. An arrangement for shifting a transmission, the arrangement comprising:
 a first transmission component, a second transmission component (14) and an axially displaceable shifting sleeve (17),
 the shifting sleeve (17) and the second transmission component (14) each comprise drive teeth (14a, 17a) which are matingly engagable with one another,
 the drive teeth being in a form of beveloid teeth (6a, 7a; 8a, 9a; 10a, 11a; 14a, 17a),
 the beveloid teeth being oblique teeth (10a, 11a) having an angle of inclination (β) which ranges from greater than 0° to less than or equal to 3°, and
 the beveloid teeth having a tooth profile (2, 3, 4) with a tooth thickness that varies over a tooth width (b), and the tooth thickness variation being determined by selecting flank angles of inclination ($β_L$, $β_R$).

13. The arrangement according to claim 1, wherein the beveloid teeth are configured to provide a flank clearance which is a relatively larger clearance, at a beginning of a shifting displacement, and a relatively smaller clearance, at an end of the shifting displacement.

* * * * *